United States Patent [19]

Dyck

[11] 4,174,247
[45] Nov. 13, 1979

[54] APPARATUS FOR SPLICING THE ENDS OF MAGNETIC TAPE WOUND ON SPOOLS OF THE TYPE USED IN ENDLESS TAPE CARTRIDGES

[75] Inventor: Arthur Dyck, Burnaby, Canada
[73] Assignee: International Audio Visual, Inc., Glenview, Ill.
[21] Appl. No.: 854,767
[22] Filed: Nov. 25, 1977
[51] Int. Cl.$^2$ .......................... B31F 5/00; B32B 31/00
[52] U.S. Cl. ...................................... 156/506; 156/517
[58] Field of Search ............... 156/502, 505, 506, 507, 156/157, 159, 517, 519, 521

[56] References Cited

U.S. PATENT DOCUMENTS

| | | | |
|---|---|---|---|
| 2,543,220 | 2/1951 | Ardell | 156/521 |
| 3,642,555 | 2/1972 | Nagoshi et al. | 156/502 |
| 3,787,270 | 1/1974 | King | 156/506 |
| 3,814,652 | 6/1974 | King | 156/507 |

*Primary Examiner*—Douglas J. Drummond
*Attorney, Agent, or Firm*—Hill, Van Santen, Steadman, Chiara & Simpson

[57] ABSTRACT

Individual segments of splicing tape are prepared at a splice cutting station from a continuous length of foil-thin, self adhering splicing tape. Each thusly prepared splicing-tape segment is transported by a vacuum pickup over to a splicing station at which a spool of magnetic tape has been positioned with the ends of the magnetic tape temporarily held in abutting relation by a vacuum operated, tape hold-down assembly. The vacuum pickup now moves to deposit the segment of splicing tape onto the abutting ends of the magnetic tape, and thereafter releases the vacuum hold on the splicing segment and returns to the splice cutting station to repeat the foregoing sequence. Each time the vacuum pickup moves to pickup a new splicing segment it actuates a cutting blade arranged to make a crosswise cut in the continuous length of the splicing tape that is fed around the circumference of a motor driven cutting wheel, the circumference of which forms a cutting surface carefully selected to enable the blade to reliably sever the foil-thin splicing tape. The individual splicing segments are thus formed by successive crosswise cuts spaced at increments along the length of the splicing tape, with such spacing being determined by controlled, incremental rotation of the cutting wheel during the time that the vacuum pickup is moving to and returning from the splicing station.

19 Claims, 12 Drawing Figures

APPARATUS FOR SPLICING THE ENDS OF MAGNETIC TAPE WOUND ON SPOOLS OF THE TYPE USED IN ENDLESS TAPE CARTRIDGES

BACKGROUND OF THE INVENTION

The present invention pertains to apparatus for splicing the ends of a magnetic tape wound on a spool of the type used in endless tape cartridges.

Endless magnetic tape cartridges are becoming increasingly popular because of their compact size, and their characteristic capability of providing endless sound without requiring that the cartridge be flipped-over, or that the direction of tape advancement be reversed. While a number of cartridge designs exist for providing the endless tape feature, the most successful configuration is a cartridge having a single, centrally disposed spool with the tape wound thereon such that the innermost winding of tape is withdrawn from its position adjacent the spool's hub and guided in an intricate tape guide path past one or more apertures in the cartridge housing. Such apertures permit the necessary co-action between the tape and the capstan, pinch roller and magnetic head, mounted on a tape transport designed to receive the cartridge. After traversing the cartridge apertures, the tape is guided to a position for being wound back onto the spool as the outermost winding. An example of this type of cartridge configuration is disclosed in U.S. Pat. No. 3,420,461, entitled "Endless Magnetic Tape Cartridge," issued Jan. 7, 1969 to R. P. Cousino.

In the manufacture of such endless tape cartridges, the tape is wound onto the spool such that the end of the innermost winding of the tape protrudes from a position adjacent the spool hub for being spliced to the end of the outermost winding of the tape. Because of the unique characteristics of the movement of the tape within the cartridge, it is essential that the material used to splice the ends of the tape be extremely thin, i.e., foil-like, so as not to form a thickened portion on the continuous tape which might not pass smoothly at all points along the tape path, such as at the point of withdrawal of the innermost winding of the tape adjacent the spool hub. As an example, the splice must be formed by a material that has a thickness no greater than 0.50 mils, and preferably of a material that is as little as 0.25 mils thick.

Also, it is desirable in many manufactured cartridges to provide a means for automatically stopping the tape transport at the end of the recorded material. For this purpose, the splicing segment can be formed with a metallized, conductive surface, such as an aluminized surface on a synthetic backing. The conductive surface of the splicing segment is arranged to cooperate with electrical contacts carried by the tape transport. When the segment reaches the contacts, the conductive surface forms a short circuit across the contacts, signalling the transport to stop the advancement of the tape.

Opposite the metallized, conductive surface, the splicing segment is usually coated with a contact adhesive. After cutting the segment to size, it is positioned to overlap abutting ends of the magnetic tape and the adhesive surface of the segment is pressed into adhering contact with the magnetic recoding surfaces (e.g., oxide surfaces) of the tape ends.

The foregoing characteristics of the splicing material, namely its ultra thinness, its metallized surface on one side and its contact adhesive coating on the other side, result in a foil-like material that is prone to wrinkle, fold and stick to itself and tear. When so deformed the splicing segment becomes unsuitable for forming a smooth, flat splice when placed on the magnetic tape. Furthermore, since the width of the magnetic tapes may be as little as one-eighth inch, the foil-like splicing material must be cut into individual splicing segments of this small width and then transported to the ends of the magnetic tape that are to be spliced. One manner of carrying out this operation is as follows. The splicing material is supplied in the form of a tape roll from which the splicing tape is withdrawn and cut into the proper size for the individual splicing segments, wherein each such prepared segment is temporarily retained on a sheet of transfer material, with the adhesive side down, ready for being manually removed, such as by tweezers, and applied to the magnetic tape. The procedure of manually transferring the individual splicing segments to the magnetic tape ends is at best, tedious and time consuming. Furthermore, the procedure typically results in a large percentage of defective splices, due to wrinkles in or other deformities of the splicing segment, or misalignment between the splicing segment and the magnetic tape. In such cases, the entire spool of magnetic tape must be discarded. The labor intensive transfer operation together with the large wastage factor, result in a relatively high per unit cost of the completed product.

In light of the above shortcomings of manual transfer techniques, attempts have been made to automate the splice segment cutting and transfering operations. One such attempt uses a cutter die and a cooperating apertured plate arranged so that the splicing tape is passed between the cutter die, which reciprocates vertically, and the apertured plate, which underlies the die, and so that the ends of the magnetic tape which are to be spliced are disposed immediately beneath the aperture in the plate. On the down stroke of the cutter die, the splicing tape is cut (i.e., blocked out) to the size of the die and aperture, and then forced by the continuing downward stroke of the die onto the underlying magnetic tape ends. While this technique works for relatively thick splicing tape (i.e., greater than 0.5 mils) it has proved completely unsatisfactory for foil-thin splicing tapes (i.e., less than 0.5 mils) because achievable tolerances of the cutter die and apertured plate do not mate closely enough to consistently sever the splicing tape at all points around the perimeter of the die and aperture. Furthermore, even if the splicing segment is cleanly cut, it tends to be easily deformed as it is pushed toward the magnetic tape ends during the ensuing downward movement of the cutter die.

Accordingly, it is an object of the invention to provide an automated or semiautomated apparatus for splicing the ends of the magnetic tape wound on spools of the type used in endless tape cartridges.

A more particular object is to provide such apparatus which automatically prepares and handles individual segments of foil-thin splicing tape of the type having a contact adhesive on one surface, in order to eliminate the most tedious and difficult phase of the splicing operation.

A further object is to provide such an apparatus having the desirable features of reducing the labor time involved in splicing each spool of tape, and at the same time reducing the amount of material wastage resulting from the formation of defective splices.

SUMMARY OF THE INVENTION

The apparatus of the invention comprises a splice segment cutting station and a splicing station. At the splice cutting station, a continuous length of foil-thin splicing tape, having a contact adhesive on one surface thereof, is fed in a partial wrap around motor turned cutting wheel, the exterior circumference of which forms a cutting surface that cooperates with a movably mounted cutting blade oriented crosswise to the length of the tape. A vacuum pickup head is mounted for movement between the cutting station and the splicing station. During movement of the pickup head between these stations, the cutting wheel is incrementally rotated to advance the splicing tape wrapped thereon, and when the pickup head moves to pickup an individual splicing segment, the head actuates the cutting blade severing the tape crosswise. Successive crosswise cuts of the tape form the individual splicing segments, which adhere to the cutting wheel until withdrawn therefrom by the pickup head. The vacuum suction of the pickup head pulls the splicing segment off the cutting wheel and the pickup head thereupon moves over to the splicing station where the pickup head positions the segment and applies it to the abutting ends of the magnetic tape, which are temporarily held in place by a vacuum operated tape hold-down assembly. After the pickup head presses the splicing segment onto the magnetic tape ends, the vacuum for the pickup head is turned off, thereby releasing the segment and allowing the pickup head to return to the cutting station.

The circumferential surface of the cutting wheel against which the cutting blade acts is selected to have the qualities of both hardness and resiliency to enable the blade to effectively sever the thin splicing tape each time the blade is forced against the tape and wheel. Because of the foil thinness of the tape, any depressions or irregularities on the surface of the cutting wheel cause the splicing tape to be merely pressed into the low spots by the blade, without severing the tape. The hardness quality of the cutting wheel surface provides a surface which can be molded, machined or otherwise fabricated to form a smooth, completely flat surface, in the plane of the blade, thereby forcing the blade to cut through the tape at all points across the tape width. The resiliency quality of the wheel surface provides some elastic give to the surface as the blade presses against the tape, causing a counteracting pressure that forces the tape, at all points across its width, against the cutting edge of the blade. Any irregularities on the surface of the cutting wheel, or along the edge of the cutting blade are compensated for by this resilient give in the wheel surface enabling the cutting edge of the blade to be forced sufficiently into such surface to effect complete severance of the tape. The resiliency of the cutting wheel surface is also essential to ensure that there is no plastic deformation of the surface in reaction to the repetitive cutting action of the blade.

Preferably, the splicing station includes a spool holding fixture on which the spool of tape is positioned and held in place while the opposite ends of the tape are positioned and held in the above-mentioned vacuum operated tape hold-down assembly. The tape hold-down assembly includes two upwardly facing channel-shaped shoes, one for each end of the tape, in which the bottoms of the channels are formed with vacuum ports such that the tapes ends may be laid lengthwise within the channels and held to the bottom channel surfaces. The shoes are endwise movable relative to one another, such that they may be separated for trimming the ends of the magnetic tape, and thereafter pushed together to cause the trimmed tape ends to precisely abut for receiving the splicing segment.

Additionally, in the preferred form of the invention, the vacuum pickup head is sized and shaped to substantially match the width and length of the splicing segment so that when the segment is picked up, substantially all of the surface area of the segment is held flat against the pickup head to prevent it from being wrinkled or otherwise deformed during the transfer from the cutting station to the splicing station.

BRIEF DESCRIPTION OF THE DRAWINGS

To provide a complete disclosure of the invention, reference is made to the appended drawings and following description of one particular and preferred embodiment.

DETAILED DESCRIPTION

Figure 1:
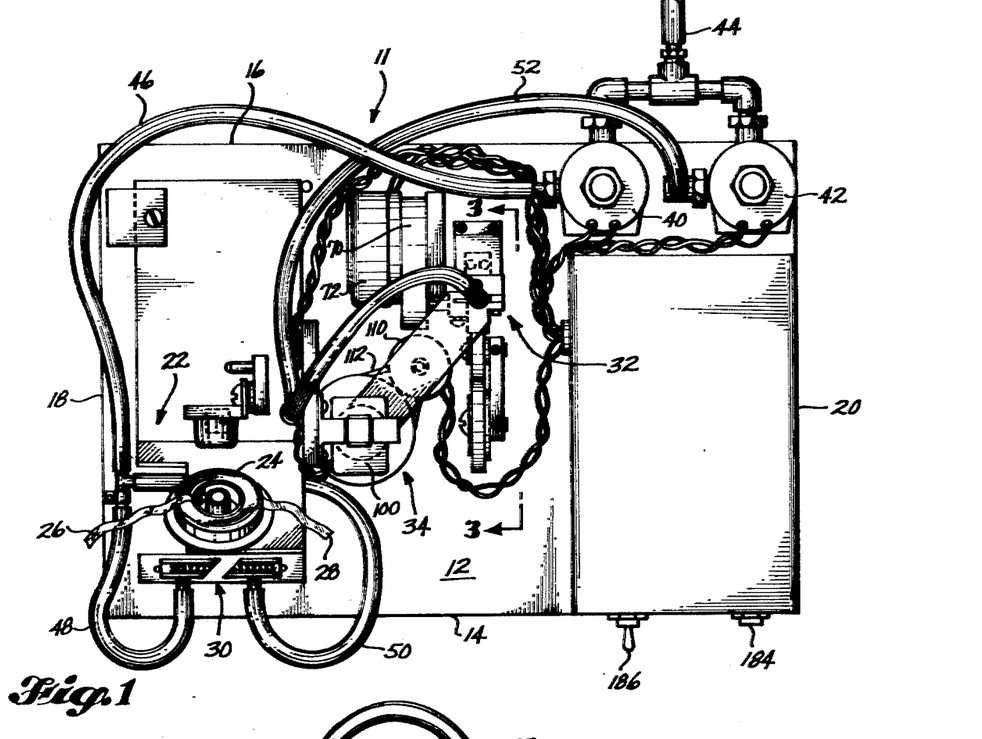
FIG. 1 is a plan view of the apparatus constructed in accordance with the invention, for splicing magnetic tape wound on spools of the type described above.

With reference to FIG. 1, the tape splicing apparatus 11 of the invention includes a base plate 12, of rectangular configuration, having a front 14, a rear 16 and sides 18 and 20. Mounted at a forward corner of base plate 12 is splicing station 22 at which a tape spool 24, of the type in an endless tape cartridge, is positioned for splicing the free ends 26 and 28 of the spooled tape while such ends are temporarily held in place by a vacuum-operated, tape-holddown assemby 30. Also mounted on plate 12, adjacent the rear 16 thereof, is a splice cutting station 32 whereat small splicing segments are cut from a continuous length of foil-thin splicing tape of the type having a conductive, metallized surface on one side and a contact adhesive surface on the opposite side. Intermediate splicing station 22 and splice cutting station 32, a vacuum operated, pickup assembly 34 is mounted on plate 12 and includes a movably mounted, vacuum pickup head for picking up the cut splicing segment at station 32 and transporting such segment to station 22 where it is applied to tape ends 26 and 28 after they have been properly positioned in abutting relation in tape-holddown assembly 30. Each time the pickup head of assembly 34 moves to pickup a splicing segment at station 32 an additional segment is cut, and thus prepared for being subsequently picked up during the next operating cycle of assembly 34.

At a rear corner of plate 12, diagonally opposite station 22, a pair of solenoid valves 40 and 42 are mounted and jointly connected to receive a common vacuum source via conduit 44. Solenoid valve 40 selectively communicates the vacuum source to tape-holddown assembly 30 by means of hoses 46, 48 and 50, and solenoid valve 42 selectively communicates the vacuum source to pickup assembly 34 though conduit 52.

A housing 54 is mounted adjacent side 20 of plate 12, forwardly of solenoid valves 40 and 42 and serves to house an electrical controller that governs the sequence of operation of assembly 11.

Figure 3:
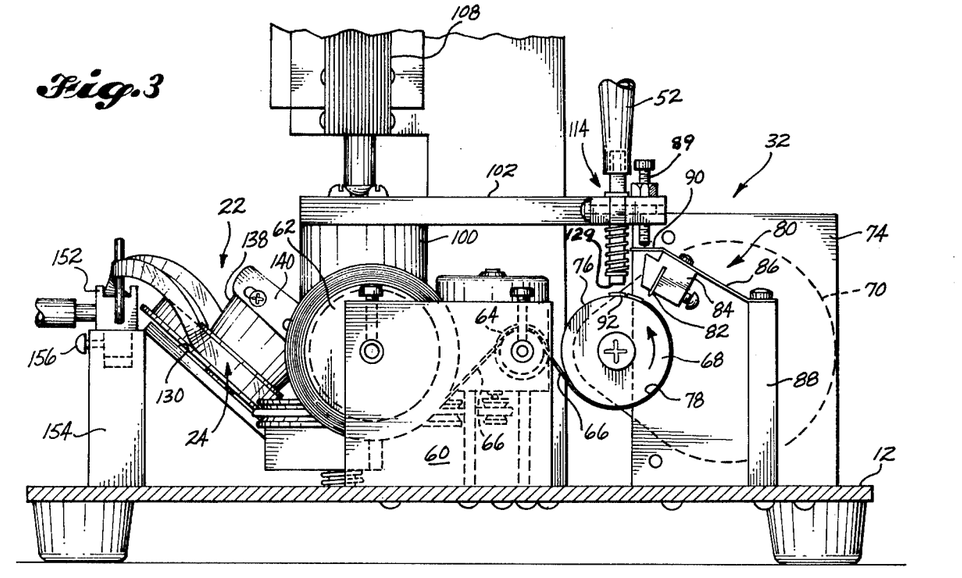
FIG. 3 is an enlarged, fragmentary view of a portion of the apparatus of FIG. 1 as viewed from arrows 3—3 therein.
Figures 4, 5, 6:
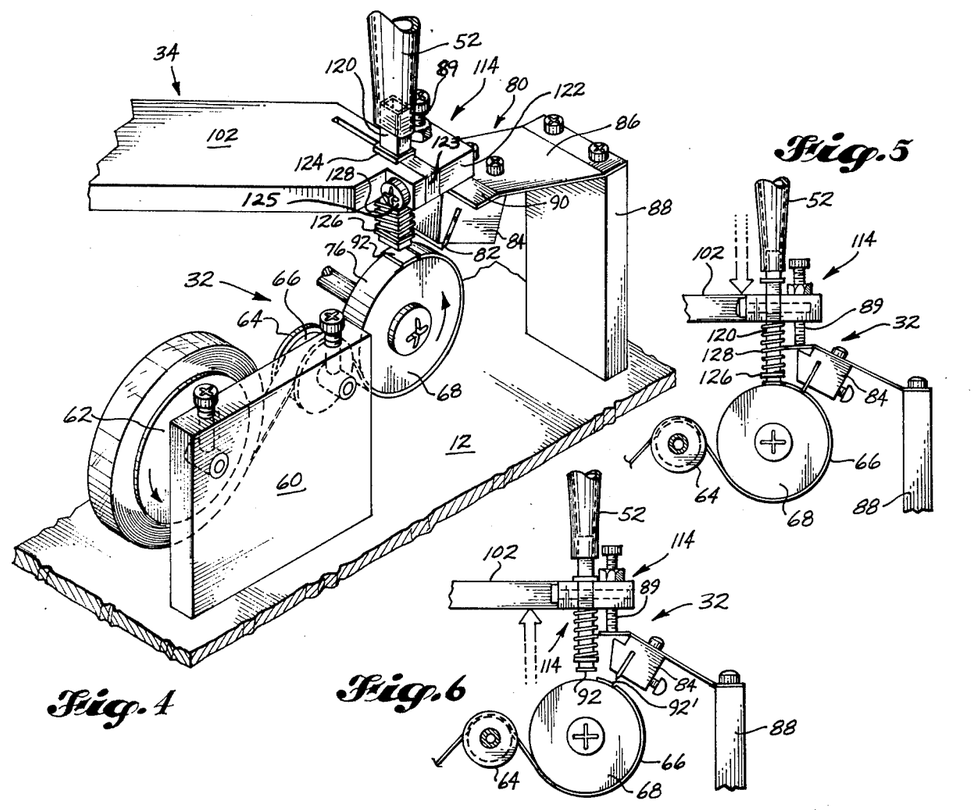
FIG. 4 is a detail view, in isometric, of the cutting station which forms a part of the apparatus of FIG. 1.
FIG. 5 is another detailed view of a fragment of the cutting station of FIG. 4, showing the relative positions of the components during one operating sequence of the apparatus.
FIG. 6 is a view similar to FIG. 5 showing the position of the components during another stage of the operating sequence.

With reference to FIGS. 3 and 4, cutting station 32 includes an upright stand 60 secured to base plate 12 and on which a splice tape supply spool 62, and an idler pulley 64 are journalled for rotation, about spaced parallel, horizontal axes for feeding a continuous length of splicing tape 66 from spool 62 to a cutting wheel 68. Wheel 68 is turned by a shaft of a reduction gear assembly 70 (FIGS. 1 and 3) which is preassembled with an electric motor 72 and mounted on an upright stand 74. Assembly 70 is oriented so that wheel 68 rotates about a horizontal axis parallel to the axes of spool 62 and pulley 64, and is located on the opposite side of pulley 64 from spool 62 such that splicing tape 66 is withdrawn from the bottom of spool 62 and passed over the top of pulley 64 and then beneath and around wheel 68, in a wrap extending approximately three quarters of the way about the outer circumferential surface 76 thereof, and terminating thereon at a substantially over-center position. The nonadhesive surface of tape 66 is in contact with pulley 64, while the adhesive surface 78 is in contact with wheel surface 76, holding the tape to wheel 68 and enabling the tape to be withdrawn from spool 62 as wheel 68 is rotated in a counterclockwise direction as viewed in FIG. 3 by motor 72 via gear assembly 70.

Positioned adjacent surface 76 of wheel 68 is a cutting blade assembly including a tape cutting blade 82 mounted in a blade holder 84 which orients blade 82 crosswise of the length of splicing tape 66 at a position proximate the top of the wheel but slightly to the rear of the over-center position. Blade 82 and holder 84 are mounted for movement to and from surface 76 of wheel 68 by a leaf spring member 86 which is mounted in an elevated position above base 12 by a stand 88. Member 86 biases blade 82 away from wheel surface 76 but enables the blade to be pressed against surface 76 in reaction to a downward force on a flange 90 of member 86 applied by a downward stroke of the movable pickup head of assembly 34 as described more fully hereinafter. As blade 82 is forced against wheel 86, surface 76 thereof forms a cutting surface which assists the blade in severing the tape, crosswise of its length, thereby cutting the continuous length of tape into a plurality of segments 92, each sized for application to the tape ends at splicing station 22.

For the reasons more fully discussed above, the preferred splicing tape 66 is so thin that absent a carefully chosen cutting surface 76 for wheel 68, blade 82 will not reliably sever the tape, leaving uncut portions of the tape, such as where the surface of the roller is pitted, grooved or otherwise nonuniformly smooth. It is preferable to use a material for wheel 68 that has a surface of suitable hardness and resiliency to enable blade 82 to be forced into cutting contact with the tape at all points across the width of the tape. In particular, materials having the hardness and surface resiliency of polytetrafluoroethylene (e.g. TEFLON, a trademark and product of E. I. Dupont De Nemours, Inc., Wilmington, Delaware), has proved effective for this purpose. The material is hard enough to form a flat cutting surface, in the plane of blade 82 and yet is sufficiently resilient to develop a counter-pressure that forces the tape against the cutting edge of the blade, and thereby completely sever the tape, but without allowing the blade to scar the surface such as by forming grooves or depressions therein which would cause subsequent cutting failures.

Also by providing a cutting wheel material, such as above, which is capable of being formed with a uniformly smooth surface, the contact adhesive of the splicing tape 66 forms only a weak bond with the wheel surface 76, sufficient to hold tape 66, and segments 92 cut therefrom, in place, but not so strong as to prevent vacuum pick-up assembly 34 from lifting segments 92, intact, off of surface 76. Since the adhesive surface of tape 66 holds each cut segment 92 in place on wheel surface 76, in position for being picked up by assembly 34, as described below, no manipulation of segment 92 is required that might cause it to be wrinkled or be otherwise deformed.

As mentioned above, the splicing tape 66 must be less than 0.5 mils thick in order to function properly in the described type of endless tape cartridges, and a thickness of only 0.25 mils is preferred. As an example, a suitable splicing tape that has an aluminized surface on one side and a contact adhesive surface on the other side, and has a polyester backing, and a thickness of 0.25 mils, is available from the 3M Company, of Minnesota, sold under the brand name, "Scotch", as video splicing tape No. 394-1/4.

Figure 2:
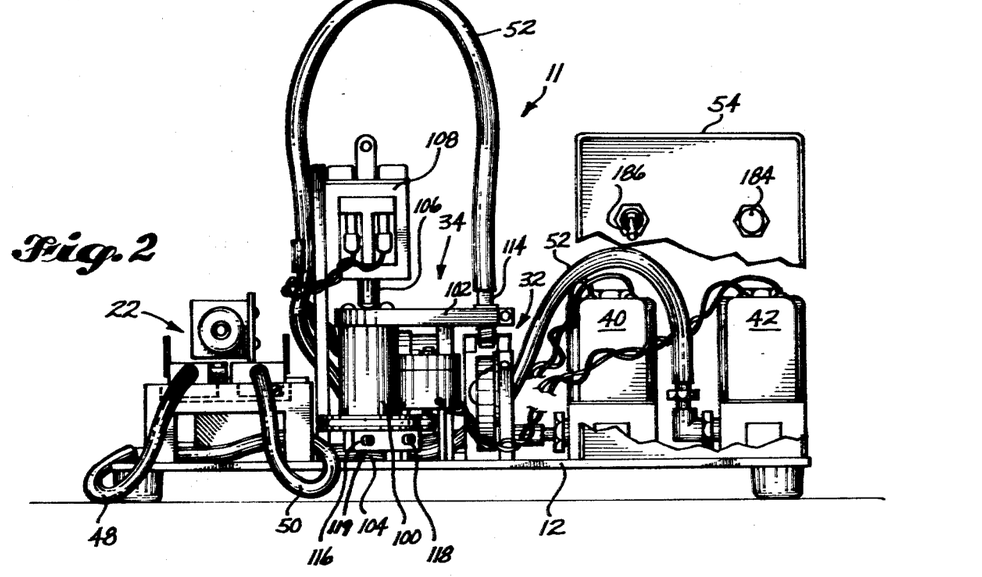
FIG. 2 is a front elevation view of the apparatus of FIG. 1.

Assembly 34 as shown in FIGS. 1 and 2 includes a centrally disposed rotor 100 mounted on a vertically oriented shaft (not shown) for both rotation about and up and down sliding reciprocation on such shaft. A pickup head support arm 102 is affixed to an upper end of rotor 100 and projects radially outwardly therefrom for rotation in a horizontal plane and for up and down movement. A compression spring 104 biases rotor 100 upwardly against a downwardly projecting plunger 106 of a solenoid 108. Rotor 100 and arm 102 are thus normally held in a relatively elevated position with respect to base plate 12 and can be forced downwardly by energizing solenoid 108 to drive plunger 106 and thus rotor 100 downwardly against the bias of spring 104.

With reference to FIG. 1, rotor 100 is controllably rotated by a reversible electric motor 110 that is drivably coupled to the rotor by means of a belt and pulley drive assembly 112. Depending upon the drive direction of motor 110, rotor 100 and arm 102 are either rotated clockwise as viewed in FIG. 1 to move a pickup head assembly 114 mounted at the outboard end of arm 102 (FIGS. 2, 3 and 4) from cutting station 32 to splicing station 22, or counterclockwise, again as viewed in FIG. 1, from station 22 back to station 32. Adjustable set screw stops 116 and 118, provided on a flange 119 depending from rotor 100, contact fixed abutments (not shown) on plate 12 to limit the rotational travel of rotor 100 and thus arm 102 to properly align pickup head assembly 114 at each of stations 22 and 32.

With reference to FIG. 4, pickup head assembly 114 is vacuum operated and is formed by a hollow, elongate tubular member 120 having a rectangular cross section and mounted for vertical reciprocation adjacent outboard end 122 of arm 102. Arm 102 is formed at end 122 with a vertically oriented opening, defined in part by a spacer 123 held in place by screw 125, which conforms to the external shape of member 120 such that member 120 is vertically slidable relative to the horizontal plane of arm 102, and is limited in its vertical reciprocation by an upper flange 124 which shoulders against the upper surface of arm 102 and a lower flange 126, spaced adjacent to, but above, the lower end of member 120. A helical compression spring 128 disposed on member 120 is held captive between lower flange 126 and a lower surface of arm 102, biasing member 120 downwardly to a position in which flange 124 is shouldered against the upper surface of arm 102. The upper end of member 120 is connected to a flexible vacuum hose 52 which enables head assembly 114 to move relative to base 12. The lower end 129 of member 120 (FIG. 3) has an end wall which is perforated about substantially the entire end wall area to form a plurality of vacuum ports which communicate with a vacuum source through hose 52 for selectively picking up and subsequently releasing each cut splicing segment 92.

Arm 102 also carries at its outboard end, adjacent assembly 114, a vertically oriented, adjustable cutter actuating screw 89 which is located so as to contact flange 90 of assembly 80 and force blade 82 against wheel 68 when arm 102 is driven downwardly by solenoid 108 (FIG. 3).

Figures 7, 8, 9, 10, 11:
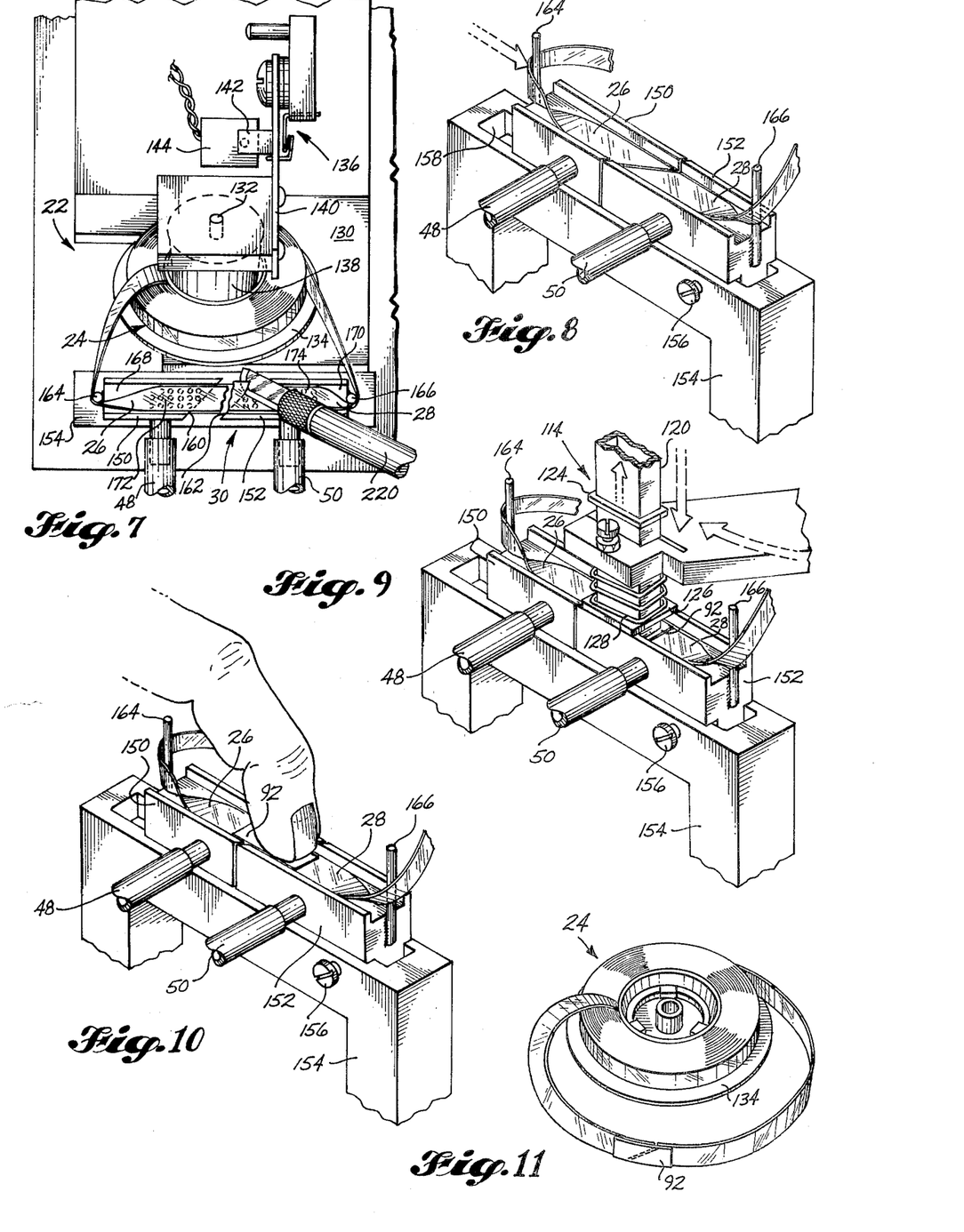
FIG. 7 is an enlarged, plan view of the splicing station forming a part of the apparatus of FIG. 1.
FIGS. 8, 9 and 10 are a set of detailed views, in isometric, showing different stages of the operating sequence which occurs at the splicing station shown in FIG. 7.
FIG. 11 is a detailed view of the completed, spliced spool of tape ready for being installed in the endless tape cartridge.

With reference to FIG. 7, splicing station 22 includes a spool holding platform 130 which slopes downwardly and rearwardly (see FIG. 3) and has a centrally located, perpendicular spindle 132 on which a tape spool 24 is removably positioned, with a flat disc portion 134 of spool 24 resting on the top of platform 130 and the spool of tape disposed so that tape ends 26 and 28 can be positioned in holddown assembly 30. A spring biased spool holddown assembly 136 is positioned rearwardly of platform 130 and includes a rubber knob 138 affixed to an arm 140 which swings in a vertical plane between a retracted position, as shown in FIG. 1, and a spool holddown position, as shown in FIGS. 3 and 7. When swung to the holddown position, a right angle flange 142 on arm 140 operates a switch 144 that controls the vacuum applied to assembly 30 as described more fully hereinafter.

Tape-holddown assembly 30 is formed by a pair of vacuum operated, channel shaped, holddown shoes 150 and 152, each of which has an upwardly oriented, elongate, shallow channel, of width just slightly greater than that of tape ends 26 and 28. Shoes 150 and 152 are mounted in end-to-end alignment on a stand 154 which locates shoes 152 and 154 adjacent the forward and thus the highest edge of tape spool 24 when the spool is positioned on platform 130 (see FIG. 3). One of the shoes, namely shoe 152 is held stationary on stand 154 by a lock screw 156, while the other shoes 154 is slidable in a slot 158 formed in the top of stand 154 between a position in which the ends 160 and 162 of the shoes are separated, to provide for trimming the tape ends 26 and 28, and a position at which ends 160 and 162 are abutting for precisely abutting the tape ends 26 and 28 for receiving the splicing segment. Ends 160 and 162 are formed along complimentary, vertical planes, obliquely angled with respect to the lengthwise dimensions of shoes 150 and 152 so that the ends of the tape abut along a diagonal line when spliced.

Upright, tape guiding and loop sizing pins 164 and 166 are affixed to the remote ends of shoes 150 and 152, centrally located with respect to the shoe channels, and projecting above the planes of the channels by an amount greater than the width of the tape such that the tape ends 26 and 28 extending from spool 24, are wrapped around the front of pins 164 and 166 and then placed flat against the channeled bottoms 168 and 170 of the shoes. Each shoe 150, 152 is formed with a plurality of vacuum ports 172 and 174 located on channel bottoms 168 and 170, adjacent shoe ends 160 and 162 and communicating through internal chambers within the shoes with vacuum fittings connected to hoses 48 and 50.

Figure 12:
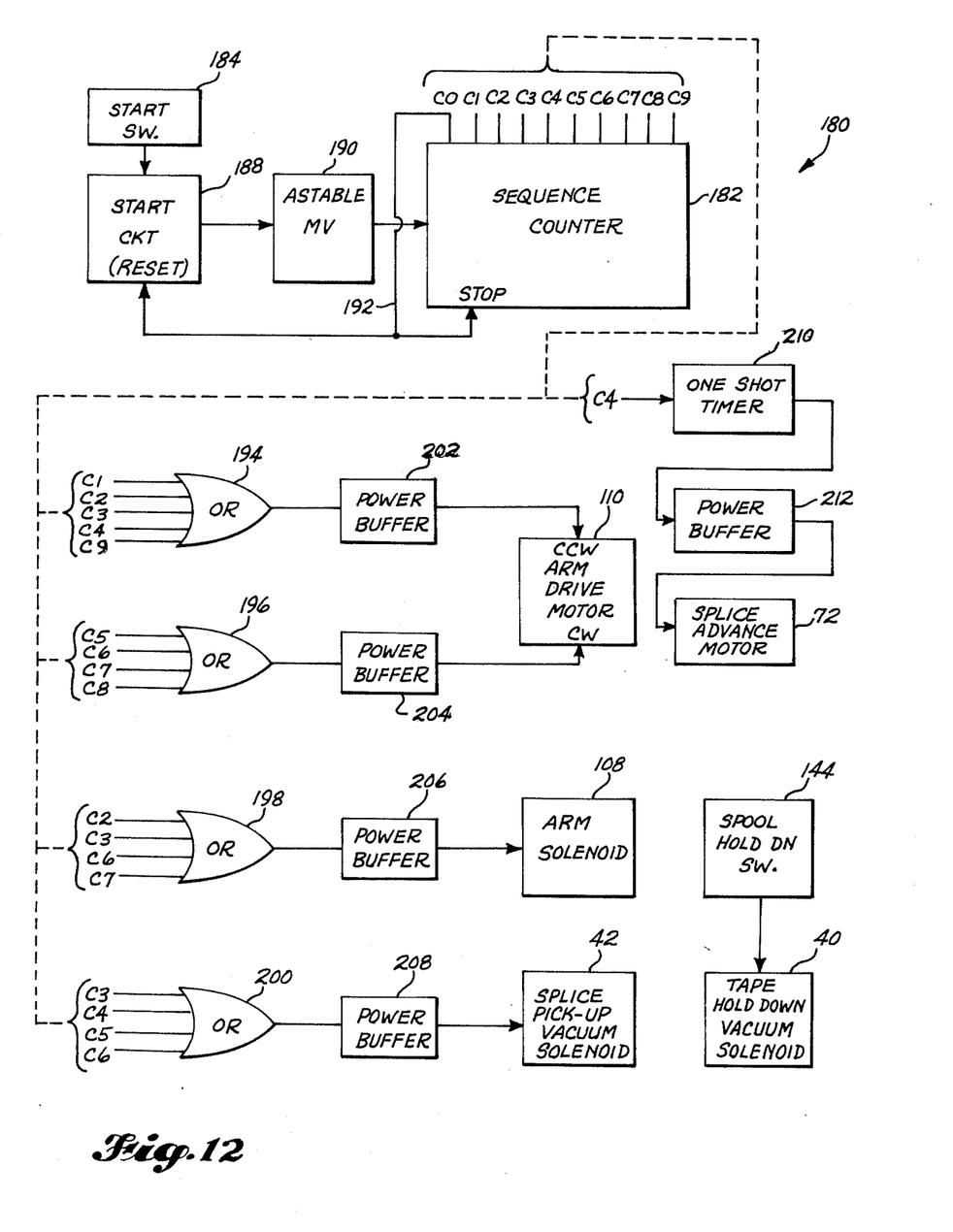
FIG. 12 is a block diagram of a controller for operating the various electrically controlled components of the apparatus shown in FIG. 1.

With reference to FIG. 12, an electrical controller 180 for apparatus 11 includes a sequence counter 182 which has a series of outputs C0–C9 that function to time the automatic operating sequences of splicing tape advance motor 72, arm drive motor 110, are solenoid 108 and pickup vacuum solenoid valve 42. A counting cycle of counter 182 is initiated by a start switch 184 which may be a manually actuated switch located on housing 20 as shown in FIG. 1, adjacent a power switch 186. In response to switch 184 a start circuit 188 activates an astable multivibrator 190 which thereupon remains active throughout a complete operating cycle to continuously feed a train of pulses to counter 182 causing counter 132 to be clocked through a succession of counting states, each such state being associated with one of outputs C0–C9 assuming a logic high. At the end of a counting cycle, counter 182 is recycled back to the first state during which output C0 is high. Output C0 is connected over line 192 for stopping counter 182 at the first state and resetting start circuit 188 to deactivate multivibrator 190.

Outputs C0–C9 of counter 182 are connected in a predetermined fashion to the inputs of a set of four OR gates 194, 196, 198 and 200. OR gate 194 is a five input gate receiving outputs C1–C4 and C9 and has an output energizing arm drive motor 110 via power buffer 202 in a direction to cause counterclockwise rotation of arm 102 (as viewed in FIG. 1) to position pickup head assembly 114 at cutting station 32. Conversely, OR gate 196 is a four input gate receiving C5–C8 and has an output connected via power buffer 204 to energize arm drive motor 110 in a direction to cause clockwise rotation of arm 102 to advance the pickup head assembly 114 to splicing station 22. The counterclockwise energization of motor 110 thus occurs during counting states C1–C4 at the beginning of the cycle of counter 182 and during C9 at the end of the counting cycle, the latter for resetting the arm 102 to its position at cutting station 32. Clockwise energization of motor 110 occurs in the middle of the counting cycle during which C5–C8 are high for moving arm 102 to splicing station 22.

OR gate 198 is a four input gate receiving C2, C3 and C6, C7 for energizing arm solenoid 108 via power buffer 206 when these counter outputs are high. Finally, OR gate 200 is a four input gate receiving C3–C6 for operating pickup vacuum solenoid valve 42 through power buffer 208 during logic high at outputs C3–C6.

Splicing tape advance motor 72 is energized for a precisely timed interval determined by one shot timer 210 which is triggered by counter output C4 going high.

During the time out interval of timer 210, motor 72 is energized via a power buffer 212 which results in a predetermined increment of advancement of splicing tape 66 on cutting wheel 68 (FIG. 4).

The vacuum applied at tape holddown assembly 30 is not operated by sequence counter 182 but rather is operated automatically whenever arm 140 of spool holddown assembly 136 (FIG. 7) is flipped down, to hold the tape spool at station 22, thereby causing flange 144 to operate switch 144 and thus energize vacuum solenoid valve 40.

Operation

With reference to FIG. 7, tape spool 24 is slipped over spindle 132 and held down on platform 130 by spool holddown assembly 140, which causes solenoid valve 40 to communicate a vacuum source to shoes 150 and 152 of assembly 30. Initially shoes 150 and 152 are separated as shown in FIG. 7 and the tape ends 26 and 28 are pulled snugly around pins 164 and 166 and the back side (non-magnetic surface) of the tapes are placed down againt vacuum ports 172 and 174 to hold the tape ends in place in channels 168 and 170 with the magnetic recording surface facing up. A scalpel 220 is now used to trim tape ends 26 and 28 along the diagonal edges of shoe ends 160 and 162. After doing so the movable shoe 150 is shifted to the right to cause shoe ends 160 and 162 to abut and thereby cause the diagonally trimmed edges of the tape ends 26 and 28 to also abut.

Start button 184 is now actuated, causing controller 180 FIG. 12) to rotate pickup head arm 102 in a counterclockwise direction as viewed in FIG. 1, positioning pickup head assembly 114 directly over cutting wheel 68 at station 32 as depicted in FIG. 4. Thereupon solenoid 108 is automatically energized pressing arm 102 and thus pickup head assembly 114 down against the cut segment 92 on wheel 68 which prior thereto has rotated to precisely position segment 92 immediately beneath the lower end 129 of member 120. A slight overstroke is provided in the downward movement of arm 102 to cause an upward, counter movement of member 120 relative to arm 102 (after end 129 contacts segment 92) slightly compressing spring 128 as depicted in FIG. 5. Concurrently, a vacuum is applied to tubular member 120 via hose 52 by solenoid valve 42 (FIGS. 1 and 12) which holds the segment 92, at its upper nonadhesive surface, to end 129 of member 120, enabling pickup head assembly 114 to lift segment 92 off of wheel 68, overpowering the adherance of the adhesive, as arm 102 moves upwardly upon the deenergization of arm solenoid 108 as illustrated by FIG. 6.

During the downstroke of arm 102 and head assembly 114, screw 89 carried by arm 102 contacts flange 90 of leaf spring 86, forcing blade 82 down against wheel 68. A crosswise cut is thus made in the splicing tape, and this operation is repeated each time assembly 114 is moved to pick up a segment 92, thereby forming successive crosswise cuts in which adjacent cuts form one of segment 92.

Arm 102 is now rotated clockwise to move pickup head assembly 114 over to splicing station 22, where the end of conduit 120 is properly oriented over the abutting ends of the magnetic tape held in shoes 150 and 152 as shown in FIG. 9. Arm solenoid 108 is again energized, forcing end 129 of member 120 down onto the abutting tape ends, pressing the adhesive surface of segment 92 against the magnetic tape. As above, a similar upward, counter movement of head assembly 114 occurs upon the downward movement of arm 102 in order to insure that the splicing segment is pressed against the magnetic tape. While holding the segment in the position as shown in FIG. 9, the pickup head vacuum is removed by controller 180 by closing solenoid valve 42, enabling head assembly 114 to release segment 92 as arm 102 returns to its up position upon deenergization of solenoid 108. Thereafter arm 102 is rotated back to position assembly 114 at cutting station 32.

During the movement of arm 102 over to splicing station 22 and back again to cutting station 32, cutting wheel 68 is rotated counterclockwise as viewed in FIGS. 5 and 6 by a predetermined angular amount by means of motor 72 responding to one shot timer 210 and controller 180 (FIG. 12). Thus when pickup head assembly 114 and arm 102 are driven downwardly at cutting station 32, forcing cutting blade 82 against the splicing tape 66 on wheel 68, splicing tape 66 has advanced on the wheel by an amount which provides the desired width of each of segments 92. By way of example, the dimension of segment 92 between the crosswise cuts made by blade 82 may be one-eighth inch, for matching one-eighth inch wide magnetic tape, while the width of the uncut splicing tape 66 as supplied on spool 62 may be one-quarter inch, which becomes the length dimension of segment 92 when cut at station 32 and thereafter applied to the tape ends at station 22. In this regard it is observed that stations 32 and 22 are arranged on base plate 12 so that the rotation of arm 102 therebetween orients the longest dimension of segment 92 lengthwise of the magnetic tape when segment 92 is deposited thereon.

Blade 82 is spaced circumferentially from pickup head assembly 114 by the width of one cut segment 92, such that as assembly 114 moves down to pick up a prepared segment 92, a new segment 92' is cut which will be subsequently rotated to a position aligned under the pickup head assembly.

After each segment 92 has been applied to the tape ends by head assembly 114, and while tape ends 26 and 28 are still held by the vacuum applied to shoes 150 and 152 of assembly 30, it is desirable to use an index finger to press down on the splice as shown in FIG. 10, to insure a positive bond between segment 92 and the magnetic tape. Thereafter spool holddown assembly 136 is retracted, which automatically turns off the vacuum at shoes 150 and 152, allowing the spliced spool of tape 24 to be removed from station 22. The completed, spliced spool of tape 24 is illustrated in FIG. 11.

While only a particular embodiment has been disclosed herein, it will be readily apparent to persons skilled in the art that numerous changes and modifications can be made thereto without departing from the spirit of the invention.

The embodiments of the invention in which an exclusive property or privilege is claimed are defined as follows:

1. A splicing apparatus for joining the ends of a magnetic tape wound on spools of the type used in endless tape cartridges in which an endless tape is withdrawn from the innermost on the spool and returned to the spool as the outermost winding, comprising:
   splicing tape supply means for supplying a continuous length of splicing tape of the type having a contact adhesive on one surface and haing a foil-like thickness dimension selected to insure that a splice formed thereby on the magnetic tape moves smoothly past all points in the tape path of the endless tape cartridge;

cutting means including a cutting blade, a coacting cutting surface, and means for lengthwise advancement of the splicing tape so that the adhesive surface thereof is moved into contact with and adherence to said cutting surface, and means for controllably advancing said cutting surface and the splicing tape adhering thereto passed said blade and for actuating said blade to sever the splicing tape into individual splicing segments which are retained on said cutting surface by the contact adhesive of the splicing tape;

magnetic tape holding means mounted in fixed, spaced relation to said cutting means for holding opposed ends of a spool of tape in end to end abutment; and vacuum pickup means mounted for movement between said cutting means and said magnetic tape holding means, and including means for picking up one of said splicing segments off of said cutting surface and transporting said segment to said magnetic tape holding means and placing said segment in splicing position with the adhesive surface in overlapping contact with surfaces of the tape adjacent the abutting end.

2. The splicing apparatus of claim 1, wherein said thickness dimension of said splicing tape is 0.5 mils or less.

3. The splicing apparatus of claim 1, wherein said splicing tape has a metallized, conductive material provided on the surface thereof opposite said contact adhesive.

4. The apparatus of claim 1 wherein the cutting surface has a deformable resiliency selected to cause a pressure counteracting that of the cutting blade as it deforms the cutting surface during cutting of the splicing tape.

5. The splicing apparatus of claim 1 wherein said vacuum pickup means includes a vacuum pickup head for contacting and picking up said individual splicing segments, vacuum source means for receiving a vacuum supply, and electrically controlled valve means for selectively communicating said vacuum source means with said pickup head, and wherein electrical controller means for operating said valve means to communicate said vacuum source to said pickup head when said vacuum pickup means is moved to pickup one of said splicing segments and for operating said valve means to disconnect said vacuum source means from said pickup head after said vacuum pickup means has been moved to place said splicing segment in splicing position on said magnetic tape.

6. The splicing apparatus of claim 5 wherein said pickup head has an internal chamber that communicates with said vacuum source means through said valve means, and has a flat exterior pickup surface of predetermined peripheral shape and size, said pickup surface haing a plurality of vacuum ports formed therein which extend inwardly and communicate with said internal chamber, and wherein said exterior pickup surface of said pickup head substantially matches the shape and size of the surface of each splicing segment that is to be contacted by and picked up by said head such that substantially the entire surface area of each splicing segment is held flat against said exterior pickup surface of said head during the pickup up, transporting and placing of said segment on said magnetic tape.

7. The splicing apparatus of claim 1 wherein said means for holding the opposing ends of the magnetic tape comprises a spool holddown means and vacuum operated, channel-shaped magnetic tape holddown means, and wherein said spool holddown means is positioned adjacent said magnetic tape holddown means so that the opposite ends of a spooled tape are positionable in end to end abutment and in lengthwise alignment in said channel-shaped magnetic tape holddown means, and wherein said magnetic tape holddown means comprises a vacuum source means and an electrically controlled valve means for selectively communicating said vacuum source means with said vacuum operated magnetic tape holddown means for holding portions of said magnetic tape adjacent its ends in place when said valve means communicates said vacuum source means to said magnetic tape holddown means.

8. The splicing apparatus of claim 7 wherein said vacuum operated, channel-shaped magnetic tape holddown means comprises first and second channel-shaped members arranged in end to end alignment and being movable between a tape end trimming position in which the adjacet ends are spaced apart and a splicing position in which the adjacent ends of said members are abutting, and each of said members having an internal chamber communicating through said electrically controlled valve means with said vacuum source means, and a plurality of vacuum ports provided in channel bottoms of said members and extending inwardly therefrom into communication with said internal chambers, whereby the portions of magnetic tape adjacent its ends are held to the channel bottoms of said members as said members are moved to their tape end trimming position to permit trimming the ends of magnetic tape and continue to be held as said members are moved to their splicing position for properly abutting the ends of the magnetic tape for receiving the splicing segment.

9. The splicing apparatus of claim 8 wherein guide and tape loop sizing pins are provided at the remote ends of said channel-shaped members, projecting outwardly from aid channel bottoms, about which the ends of the magnetic tape may be wrapped and thereby guided into alignment with the channel bottom of said channel-shaped members.

10. The splicing apparatus of claim 7 wherein said spool holddown means includes a retractable holddown arm movable between a holddown position securing the spool of tape and a retracted position enabling withdrawal of the spool of tape from said spool holddown means, and electrical control means operatively associated with said retractable holddown arm for causing said electrically controlled valve to open and thereby communicate said vacuum source means to said magnetic tape holddown means when said arm is moved to said spool holddown position, and for closing said valve means to disconnect said vacuum source means from said magnetic tape holddown means when said arm is moved to its retracted position.

11. The splicing apparatus of claim 1 wherein said vacuum pickup means comprises a rotor means rotating about a rotor axis having a predetermined orientation with respect to said cutting means and said magnetic tape holding means, and a pickup head support arm carried by said rotor means and disposed to project transversely outwardly from said rotor axis, said rotor and pickup head support arm being sized and arranged so that said rotor rotates said support arm between a pickup position in which an outboard end of said support arm is in registry with said cutting means and a splicing position in which said outboard end of said support arm is in registry with said magnetic tape holding means, electrically controlled rotor drive means for moving said rotor means and support arm carried thereby between said pickup position and said splicing position, a vacuum pickup head mounted on said outboard end of said support arm and being movable in a direction parallel to said rotor axis, and electrically controlled actuator means for cauing said pickup head, when said support arm is in said pickup position, to be displaced from a normal first position to a second position to contact and pickup a splicing segment and then return to said first position, and for causing said pickup head, when said support arm is in said splicing position, to be displaced from said first position to said second position to place said splicing segment on the ends of the magnetic tape and then return to said first position.

12. A splicing apparatus for joining the ends of a magnetic tape wound on spools of the type used in endless tape cartridges in which an endless tape is withdrawn from the innermost winding on the spool and returned to the spool as the outermost winding, comprising:

splicing tape supply means for supplying a continuous length of splicing tape of the type having a contact adhesive on one surface and having a foil-like thickness dimension selected to insure that a splice formed thereby on the magnetic tape moves smoothly past all points in the tape path of the endless tape cartridge;

cutting means including a cutting blade, a coacting cutting surface, and means for lengthwise advancement of the splicing tape so that the adhesive surface thereof is moved into contact with and adherence to said cutting surface, and mean for controllably advancing said cutting surface and the splicing tape adhering thereto past said blade and for actuating said blade to sever the splicing tape into individual splicing segments which are retained on said cutting surface by the contact adhesive of the splicing tape;

said splicing tape supply means comprising means for rotatably supporting a spool of splicing tape, and wherein said cutting means comprises a cutting wheel, the circumference of which provides said cutting surface and about a portion of which the splicing tape is circumferentially wrapped, and controllable drive means for rotating said cutting wheel in a direction to cause the splicing tape wrapped thereon and held thereto by the adhesive surface of the splicing tape to be advanced lengthwise past said cutting blade.

13. The splicing apparatus of claim 12 wherein said cutting blade is oriented crosswise to the splicing tape as the splicing tape is advanced therepassed by the rotation of said cutting wheel, and means for mounting said cutting blade for movement between a retracted position spaced from said cutting wheel and a cutting position in which said blade is forced against said cutting wheel to make a crosswise cut of the splicing tape thereon, and further comprising cutting blade actuating means sequentially operated with said cutting wheel drive means for alternately forcing said cutting blade against said cutting wheel and rotating said cutting wheel by a controlled amount such that the splicing tape is segmentally cut by successive, crosswise cuts spaced at predetermined intervals therealong where each pair of adjacent such cuts defines one of said splicing segments.

14. The splicing apparatus of claim 13 wherein said cutting blade actuating means comprises means coacting between said vacuum pickup means and said means for mounting said blade for forcing said blade against said cutting wheel each time said vacuum pickup means moves to pickup one of said splicing segments.

15. The splicing apparatus of claim 12 wherein the circumference of said cutting wheel which provides said cutting surface is formed from a material having a hardness and a resiliency selected so as to provide both a uniformly smooth backing surface against which a cutting edge of the blade acts and a resiliency in such surface that causes a pressure counteracting that of the blade edge which presses the splicing tape against the cutting blade as the blade is pressed against said cutting wheel and a durability that resists permanent deformation of said cutting surface by said blade so as to ensure a consistent, complete crosswise severance of the splicing tape each time said cutting blade is actuated.

16. A splicing apparatus for joining the ends of a magnetic tape wound on spools of the type used in endless tape cartridges in which an endless tape is withdrawn from the innermost winding on the spool and returned to the spool as the outermost winding, comprising a splicing tape supply means for supplying a continuous length of splicing tape of the type having a contact adhesive on one surface and having a foil-like thickness dimension to insure that a splice formed thereby on the magnetic tape moves smoothly past all points in the tape path of the endless tape cartridge, cutting means for cutting individual splicing segments from the splicing tape for application to abutting ends of the magnetic tape wound on the spool and means for supporting the spool adjacent the cutting means, a rotatably mounted cutting wheel having a cylindrical circumference serving as a cutting surface, said cutting wheel being so arranged relative to said splicing tape supply means so that the continuous length of splicing tape is wrapped partially circumferentially about said cutting surface of said cutting wheel with the contact adhesive surface of the splicing tape adhering to said cutting surface;

movably mounted cutting blade means deflectable into abutting contact with and arranged proximate to said cutting surface of said cutting wheel and oriented crosswise with respect to the length of splicing tape thereon for forming crosswise cuts at longitudinally spaced intervals along the splicing tape wherein each pair of adjacent such cuts defines a splicing segment; and pickup means for picking up individual ones of said splicing segments from said cutting surface of said cutting wheel for application to the ends of the magnetic tape to be spliced, said pickup means comprising a rotating arm and a suction means at an outer end of the arm.

17. In the splicing apparatus of claim 16, wherein said thickness dimension of said splicing tape is 0.5 mils or less.

18. In the splicing apparatus of claim 16, wherein said pickup means comprises a vacuum operated pickup head mounted for movement relative to said cutting wheel for contacting the non-adhesive surface of individual splicing segmets on said cutting surface of said cutting wheel and lifting such individual splicing segment from said cutting surface by overcoming the adherence of the contact adhesive of the splicing segment to said cutting surface.

19. In the splicing apparatus of claim 16, wherein the circumference of said cutting wheel which provides said cutting surface is formed from a material having a hardness and a resiliency selected so as to provide both a uniformly smooth backing surface against which a cutting edge of said cutting blade means acts and a resiliency in such surface that causes a pressure counteracting that of the cutting blade means which presses the splicing tape against said cutting edge as the blade means is pressed against said cutting wheel and a durability that resists permanent deformation of said cutting surface by said blade means so as to insure a consistent, complete crosswise severance of the splicing tape each time said cutting blade means is actuated.

* * * * *